US008977271B2

(12) United States Patent
Choi et al.

(10) Patent No.: US 8,977,271 B2
(45) Date of Patent: Mar. 10, 2015

(54) COMPUTER-AIDED MAPPING OF SYSTEM INFORMATION MEDIUM ACCESS CONTROL PROTOCOL MESSAGES

(71) Applicant: Intel Mobile Communications GmbH, Neubiberg (DE)

(72) Inventors: Hyung-Nam Choi, Hamburg (DE); Michael Eckert, Braunschweig (DE); Maik Bienas, Braunschweig (DE); Florian Steinmann, Wolfenbuettal (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/741,703

(22) Filed: Jan. 15, 2013

(65) Prior Publication Data

US 2013/0128841 A1  May 23, 2013

Related U.S. Application Data

(60) Continuation of application No. 13/102,750, filed on May 6, 2011, now Pat. No. 8,380,204, which is a division of application No. 11/469,005, filed on Aug. 31, 2006, now abandoned.

(30) Foreign Application Priority Data

Aug. 31, 2005 (DE) .......................... 10 2005 041 273

(51) Int. Cl.
*H04W 4/00* (2009.01)
*H04W 4/06* (2009.01)
*H04W 48/12* (2009.01)
*H04L 29/08* (2006.01)

(52) U.S. Cl.
CPC ................ *H04W 4/06* (2013.01); *H04W 48/12* (2013.01); *H04L 67/34* (2013.01)
USPC ....................................... 455/437; 455/435.2

(58) Field of Classification Search
USPC ................................................ 455/437, 435.2
See application file for complete search history.

(56) References Cited

U.S. PATENT DOCUMENTS

2005/0068963 A1  3/2005  Lee et al.
2010/0098031 A1  4/2010  Charbit

FOREIGN PATENT DOCUMENTS

CN  1567769 A  1/2005
EP  984567 A1  3/2000

(Continued)

OTHER PUBLICATIONS

3GPP TS 25.331 V6.6.0, 3rd Generation Partnership Project, Technical Specification Group Radio Access Network, Radio Resource Control (RRC) Protocol Specification (Release 6), Jun. 2005.

(Continued)

*Primary Examiner* — Charles Shedrick
(74) *Attorney, Agent, or Firm* — Schwabe, Williamson & Wyatt, P.C.

(57) ABSTRACT

A method for computer-aided mapping of system information medium access control protocol messages onto a plurality of transport channels for transmission using an orthogonal frequency division multiple access method, wherein a scheduling of system information data packets information in the context of the mapping on a transport channel of the plurality of transport channels is carried out dependent on the type of the system information.

20 Claims, 6 Drawing Sheets

(56) References Cited

FOREIGN PATENT DOCUMENTS

| | | |
|---|---|---|
| EP | 1 317 110 B1 | 7/2003 |
| WO | WO-2004/089013 A1 | 10/2004 |
| WO | WO-2005/031985 A2 | 4/2005 |
| WO | WO-2005/125255 A1 | 12/2005 |

OTHER PUBLICATIONS

K.D. Kammeyer, Nachrichtenubertragung, B.G. Teubner, ISBN 3-519-16145-7, Stuttgart, Seiten 593 bis 638, 1996.

German Patent Office; Office Action for German App. No. 102005041273.4-31 mailed Aug. 31, 2010; 6 pages.

German Patent Office; Office Action for German App. No. 102005041273.4-31 mailed Apr. 6, 2006; 4 pages.

French Patent Office; Office Action for French App. No. 0607579 mailed Jun. 26, 2007; 1 pages.

French Patent Office; Office Action for French App. No. 0607579 mailed Apr. 28, 2008; 6 pages.

French Patent Office; Office Action for French App. No. 0607579 mailed Dec. 3, 2008; 1 pages.

British Patent Office; Office Action for British App. No. 0617242.3 mailed Nov. 24, 2006; 6 pages.

British Patent Office; Office Action for British App. No. 0617242.3 mailed Oct. 24, 2007; 2 pages.

Japanese Patent Office; Office Action for Japanese App. No. 2006-235663 mailed May 12, 2009; 5 pages inclusive of English translation.

South Korean Patent Office; Office Action for South Korean App. No. 2006-0083692 mailed Jun. 21, 2007; 6 pages inclusive of English translation.

United States Patent and Trademark Office; Office Action for U.S. Appl. No. 11/469,005 mailed Apr. 1, 2010; 10 pages.

United States Patent and Trademark Office; Office Action for U.S. Appl. No. 11/469,005 mailed Nov. 9, 2010; 11 pages.

United States Patent and Trademark Office; Office Action for U.S. Appl. No. 13/102,750 mailed May 6, 2011; 10 pages.

United States Patent and Trademark Office; Office Action for U.S. Appl. No. 13/102,750 mailed Jun. 11, 2012; 11 pages.

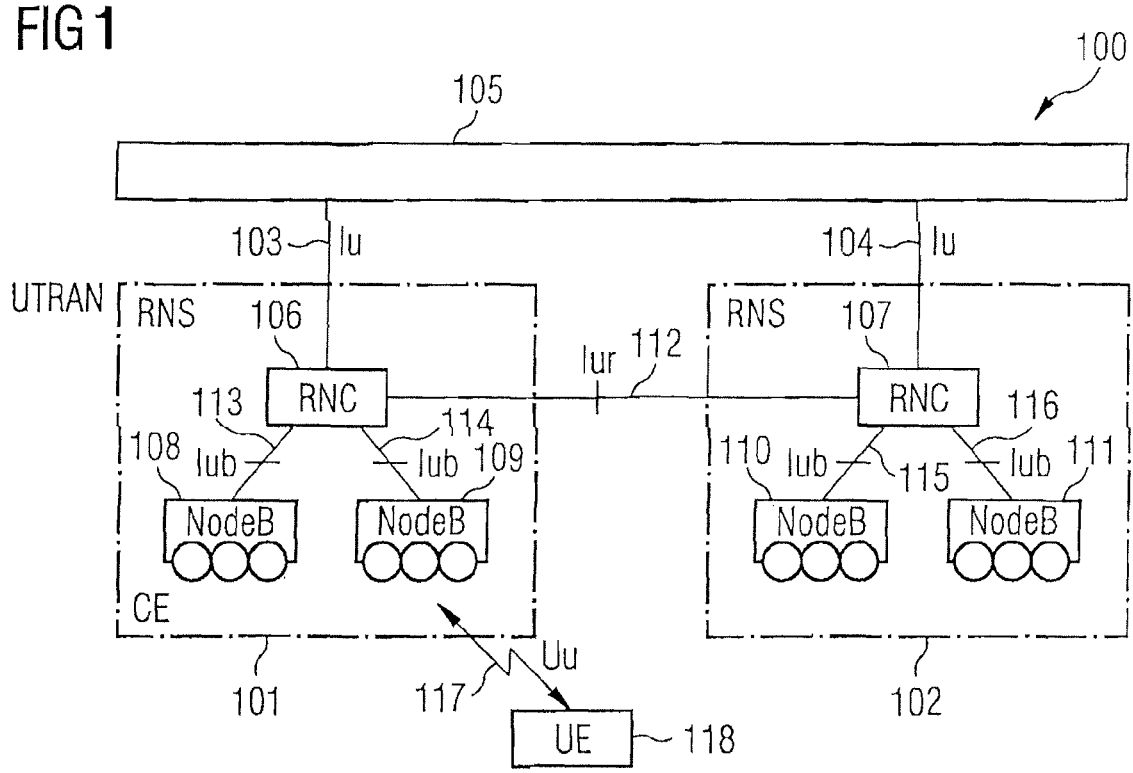

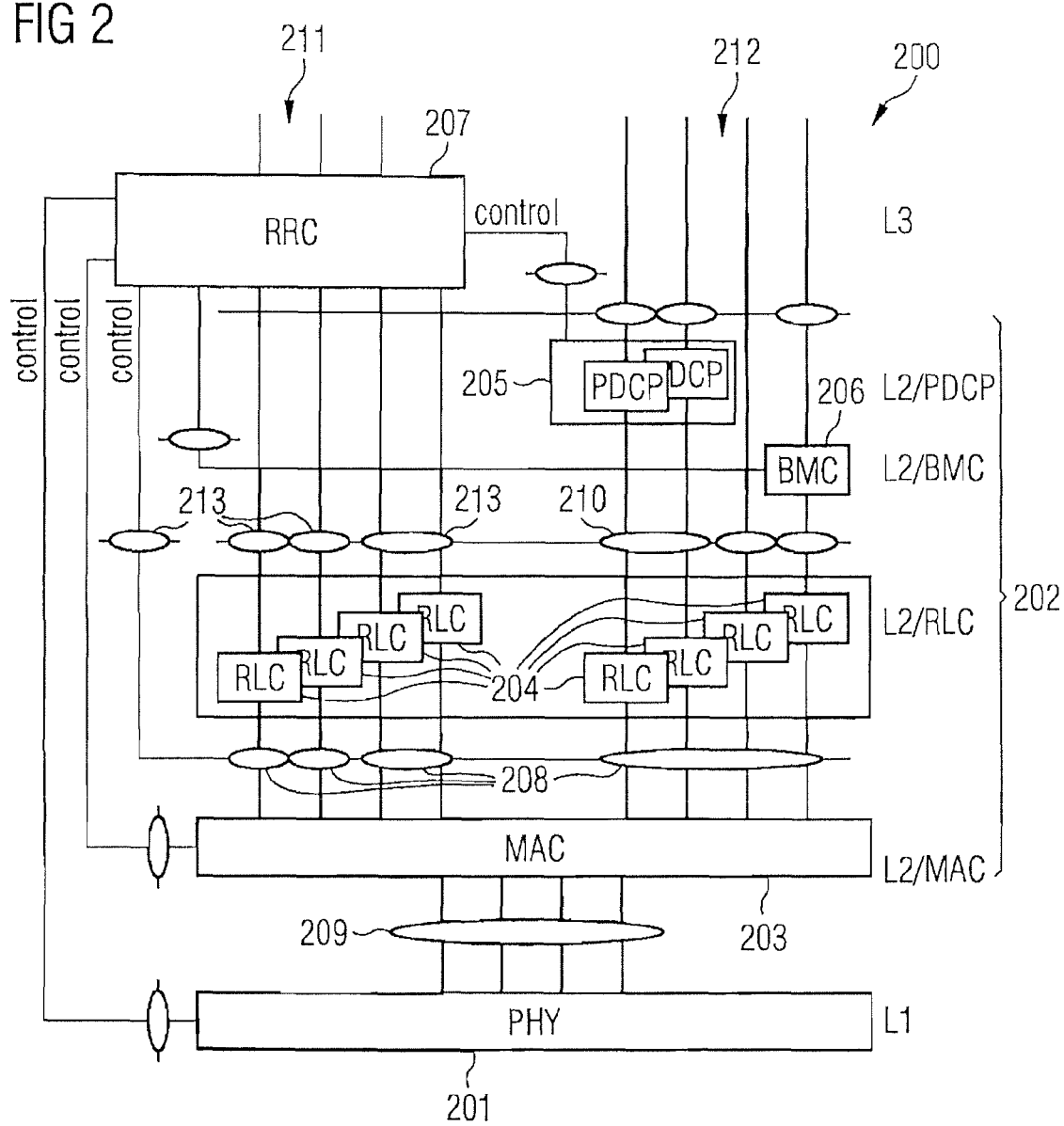

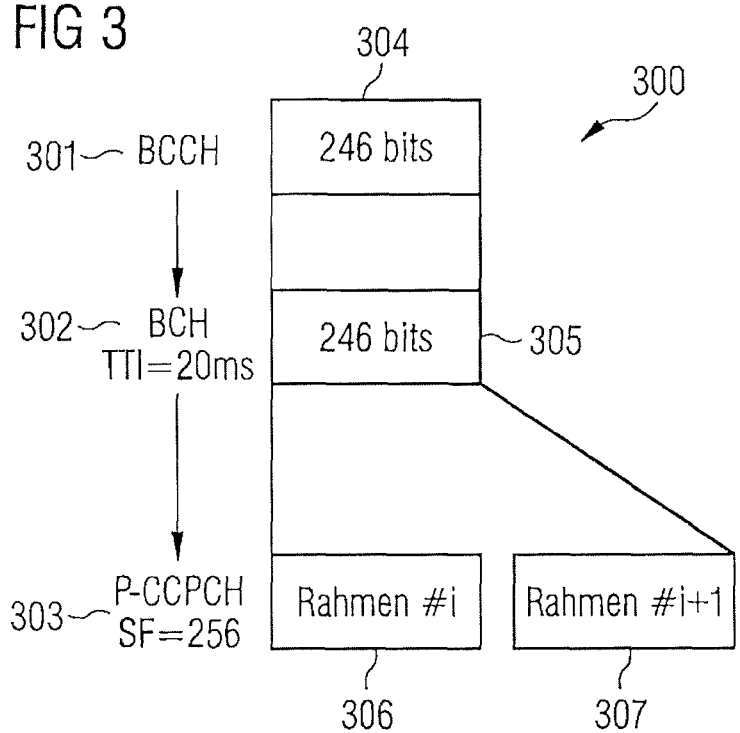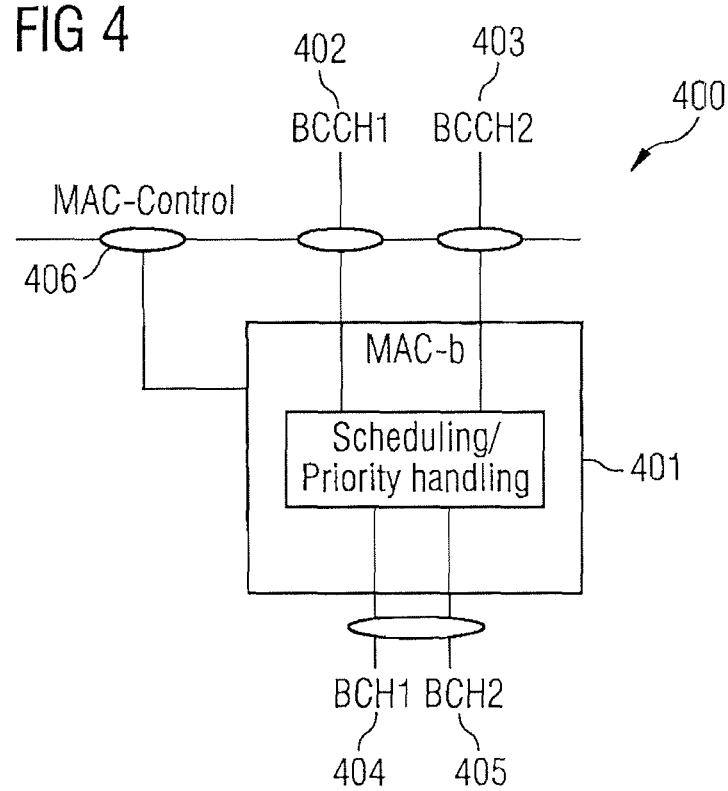

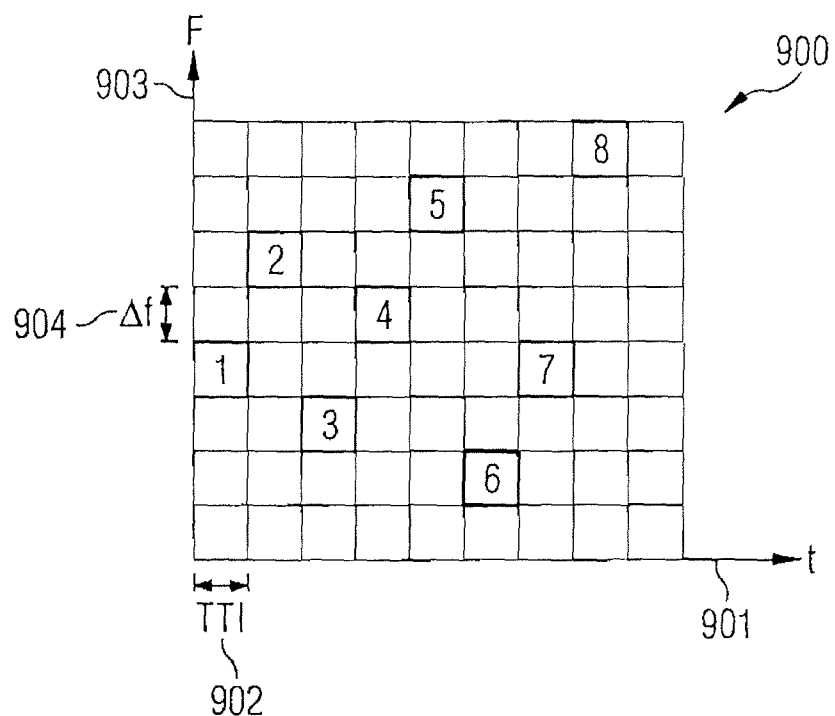

COMPUTER-AIDED MAPPING OF SYSTEM INFORMATION MEDIUM ACCESS CONTROL PROTOCOL MESSAGES

CROSS-REFERENCE TO RELATED APPLICATIONS

This application is a continuation of U.S. application Ser. No. 13/201,750, filed May 6, 2011, which is a divisional application of U.S. application Ser. No. 11/469,005, filed Aug. 31, 2006, and which claims priority to German Patent Application Serial No. 10 2005 041 273.4-31, which was filed on Aug. 31, 2005. These prior applications are incorporated herein by reference in their entireties.

TECHNICAL FIELD

The application relates to a method for the computer-aided formation of system information medium access control protocol messages, a method for the computer-aided ascertainment of system information from system information medium access control protocol messages, medium access control units, mobile radio communication devices and computer program elements.

BACKGROUND

In a cellular mobile communication system, system information needs to be broadcast to mobile terminals such that the mobile terminals can use the communication system. There is a need for methods which allow efficient and flexible broadcast of system information.

SHORT DESCRIPTION OF THE FIGURES

FIG. 1 shows a communication system based on an exemplary embodiment;

FIG. 2 shows an illustration of a protocol structure for the UMTS air interface;

FIG. 3 shows an illustration of BCCH data packets being mapped onto P-CCPCH data packets in line with an exemplary embodiment;

FIG. 4 shows an MAC-b unit based on an exemplary embodiment;

FIG. 9 shows a graph showing an OFDMA transmission method combined with a frequency hopping transmission method.

DETAILED DESCRIPTION

Figure 5A:
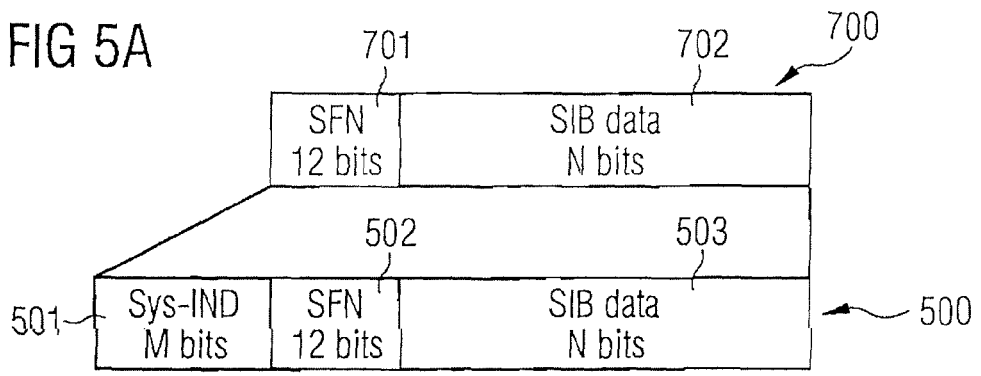
FIGS. 5A and 5B show an illustration of a first BCCH data packet (FIG. 5A) and of a second BCCH data packet (FIG. 5B) based on an exemplary embodiment.

In the current UMTS mobile radio communication standard (Universal Mobile Telecommunications Systems communications standard), also called Release 6, a maximum net transmission rate of 10 Mbps is permitted in the downlink transmission direction and of 2 Mbps is permitted in the uplink transmission direction. The uplink transmission direction, also called the uplink, denotes signal transmission from the mobile radio communication terminal to the respective UMTS base station. The downlink transmission direction, also called the downlink, denotes signal transmission from the respective associated UMTS base station to the mobile radio communication terminal. Radio transmission technologies currently specified are Frequency Division Duplex (FDD) and Time Division Duplex (TDD). The multiple access method used is based on Code Division Multiple Access (CDMA) technology.

A current topic on the 3GPP standardization committees (3GPP: $3^{rd}$ Generation Partnership Project) is the further development of UMTS to form a mobile radio communication system optimized for packet data transmission by improving the system capacity and by improving the spectral efficiency. The aim is to increase the maximum net transmission rate significantly in future, namely to 100 Mbps in the downlink transmission direction and to 50 Mbps in the uplink transmission direction. To improve transmission via the air interface, new multiple access methods are also being examined, inter alia. One possible candidate for a multiple access method which could be used for the downlink transmission direction is OFDMA (Orthogonal Frequency Division Multiple Access) in combination with TDMA (Time Division Multiple Access).

OFDMA in combination with TDMA, subsequently also called OFDMA/TDMA, is a multicarrier multiple access method in which a subscriber is provided with a defined number of subcarriers in the frequency spectrum and a defined transmission time for the purpose of data transmission.

In a cellular mobile radio communication network such as GSM (Global System for Mobile Communications) communication system or the UMTS communication system, important system information from a mobile radio cell is transmitted by a base station using broadcast signals to all subscriber appliances situated in the mobile radio cell. Examples of such system information are information specific to network operators, such as the identity of the network and of the mobile radio cell, and also the configuration of the joint radio resources. In a UMTS mobile radio communication network, the system information is scheduled by the RRC (Radio Resource Control) protocol layer in the UMTS base station (also called NodeB). The current MAC-b protocol unit has no significant function in the UMTS base station in the current UMTS communication network.

As described above, a base station in a cellular mobile radio communication network based on GSM or UMTS therefore uses broadcasting to transmit mobile radio cell information which is relevant to the communication system and to mobile radio cells to all subscriber appliances situated in the mobile radio cell. In the case of UMTS, this is done using the logical channel BCCH (Broadcast Control Channel), which is mapped on the transport channel BCH (Broadcast Channel) and is physically transmitted on the P-CCPCH (Primary Common Control Physical Channel) via the air interface.

Figure 7:
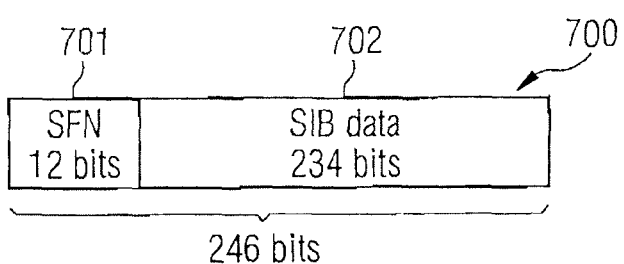
FIG. 7 shows an illustration of a BCCH data packet.

FIG. 7 shows a data format of a BCCH protocol message 700 for transmitting system information. The BCCH protocol message 700 has a system frame number (SFN) field 701 with a length of 12 bits and also a useful data field 702 for transmitting the actual system information (also called System Information Block data, SIB Data) 702 with a length of 234 bits. The system frame number field 701 depicts the timing used in the mobile radio cell and is used to synchronize the data transmission.

Overall, a large amount of system information is transmitted to the mobile radio cell.

According to the nature of the information, this information is grouped into various blocks. In this context, a distinction is usually drawn between MIB (Master Information Block) blocks, SB (Scheduling Block) blocks and SIB (System Information Block) blocks. The MIB is used to signal, inter alia, the PLMN (Public Land Mobile Network) identity and also, to a limited degree, scheduling information for the SIBs. An SB block is used to signal the scheduling information for the SIB blocks. In line with UMTS, there are currently 18 SIB types defined.

Examples of such SIB types currently defined in line with UMTS are:

SIB 1:
contains the information for the UMTS core network (CN) and also the configuration of system-related timers and constants;

SIB 3:
contains the parameters for mobile radio cell selection and mobile radio cell change;

SIB 5:
contains the configuration of the physical joint radio resources for subscriber appliances in idle mode;

SIB 6:
contains the configuration of the physical joint radio resources for subscriber appliances in connected mode; and SIB 11:
contains the information for performing measurements.

In line with UMTS, the system information is scheduled using the RRC layer or its protocol unit in the base station. Although the MAC layer (Medium Access Control layer) in the base station contains a MAC-b protocol unit, this currently has no significant function, i.e. in line with UMTS the MAC-b protocol unit currently merely maps the data from the logical channel BCCH transparently on to the transport channel BCH.

Significant properties for the transmission of the system information are as follows:

The P-CCPCH is broadcast at relatively high power so that all subscribers in the mobile radio cell can receive this channel with as little disturbance and error as possible, even if the subscribers or their mobile radio communication terminals are close to the edge of the mobile radio cell.

The transmission parameters for BCCH/BCH/P-CCPCH, such as packet data length, transmission period, spreading code, spreading factor and channeling coding are defined statically and are known throughout the system so that all subscribers or their mobile radio communication terminals in a mobile radio cell can find and receive this important system information quickly.

However, transmitting the system information conventionally has the following drawbacks, inter alia:

The gross transmission rate of 30 kbps (based on a spreading factor SF=256 and a transmission time interval TTI=20 ms) is low, which means that a relatively long time is required in order to transmit or, from the point of view of a subscriber, to receive the full system information i.e. all defined SIBs in a mobile radio cell. Depending on the mobile radio cell configuration (also called cell configuration) this reading time is in the order of magnitude of between 640 ms and a few seconds.

The transmission capacity is defined statically, which means that it is not possible to match the capacity to the respective traffic load in the mobile radio cell dynamically.

Normally, a mobile radio channel is a time-variant and frequency-variant selective channel. In the case of a fixed-location transmitter, the time variance is caused by the movement of the mobile receiver. The frequency selectivity is caused by the multipath propagation. The properties of the mobile radio channel result in the signal from the transmitter reaching the mobile receiver not only on the direct path but also on various paths with different propagation times and damping influences. The received signal is thus made up of a multiplicity of components, with their amplitudes, propagation times and phases having a random response. The received signal is therefore a distorted and disturbed version of the transmitted signal. A basic task of the receiver is thus to reverse the disturbances introduced into the transmitted signal by the mobile radio channel again and to reconstruct the transmitted signals correctly.

To transmit data from various subscribers via the mobile radio channel, "multiple access methods" are often used. It is a task of a multiple access method to regulate the subscribers' access to the mobile radio channel, so that the subscribers do not disturb one another. In doing this, the properties of the mobile radio channel are also taken into account.

By way of example the following fundamental multiple access methods are known:

Time-division multiple access methods (TDMA methods);
Frequency-division multiple access methods (FDMA methods); and
Code Division Multiple Access methods (CDMA methods).

In the case of TDMA, each subscriber has the full frequency band, but just a defined transmission period, also called Transmission Time Interval (TTI), available for transmission. During a TTI, only one transmitter is active.

In the case of FDMA, each subscriber has the full time available, but just a defined (narrow) frequency bandwidth from the total bandwidth, for transmitting the data. In each of these frequency bands, only one subscriber may ever be active.

In the case of CDMA, each subscriber has the full time and the full frequency band available for transmission. To avoid reciprocal influence on the signals from the different transmitters, each subscriber is allocated a binary code pattern, the binary code patterns being independent of one another and being used to encode or spread the useful signal on a subscriber-specific basis.

For future further development of mobile radio communication systems, high transmission rates are demanded, for example, up to 100 Mbps or above. This also requires appropriately large bandwidths. As the bandwidth increases, however, the frequency selectivity of the mobile radio channel increases, resulting in high levels of distortion in the received signal. This necessitates the use of complex receivers.

OFDMA is a suitable method which is also used for minimizing negative channel influences caused by the frequency selectivity, which means that the receiver complexity can also be significantly reduced.

OFDMA is a multicarrier method in which the signal bandwidth B is divided into M orthogonal sub bands. This means that not one frequency carrier with a large bandwidth is provided, but rather M frequency carriers with the bandwidth $\Delta f=B/M$. The OFDMA method therefore involves splitting the data stream to be transmitted over a multiplicity of subcarriers and transmitting it in parallel at an appropriately reduced data rate. In this case, the individual subcarrier frequency interval $\Delta f$ is stipulated such that the influence of the frequency selectivity is kept as low as possible. On the other hand the effects of the time variance increase as the bandwidth becomes smaller, which means that channel estimation is usually carried out as before.

In the case of OFDMA, a subscriber can be provided with the full time and a defined number of subcarriers for transmission. To improve the data transmission, OFDMA can be combined with other multiple access methods, for example, OFDMA combined with TDMA (OFDMA/TDMA) or OFDMA combined with a frequency hopping method.

Figure 8A:
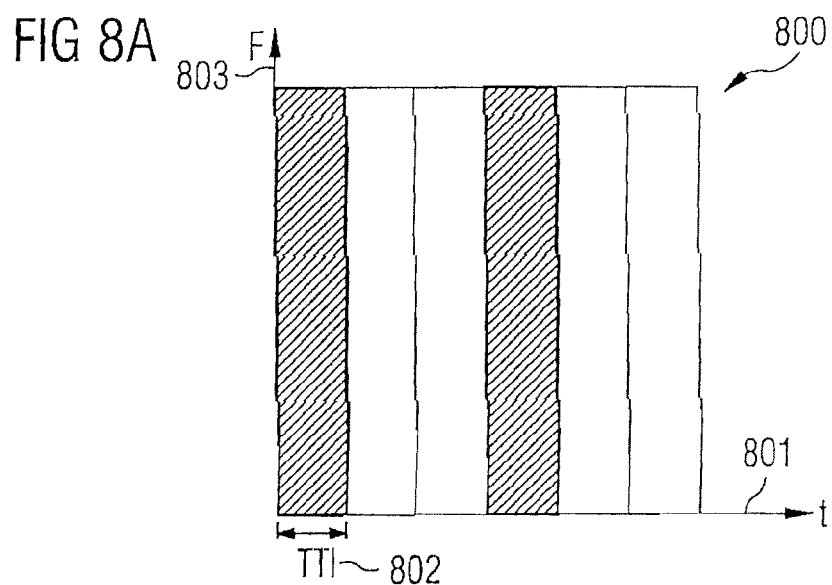
FIGS. 8A to 8C show graphs illustrating different transmission methods, namely a TDMA transmission method (FIG. 8A), an OFDMA transmission method (FIG. 8B) and an OFDMA/TDMA transmission method (FIG. 8C)
Figure 8B:
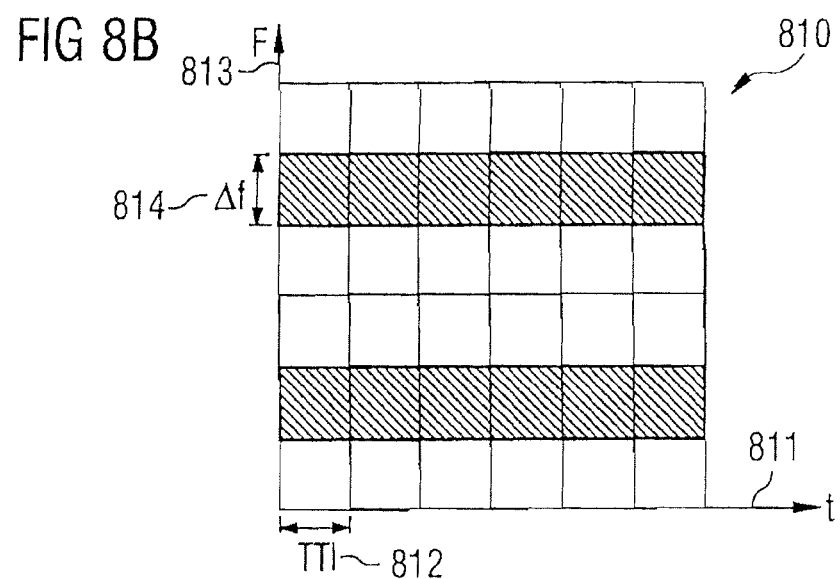
Figure 8C:
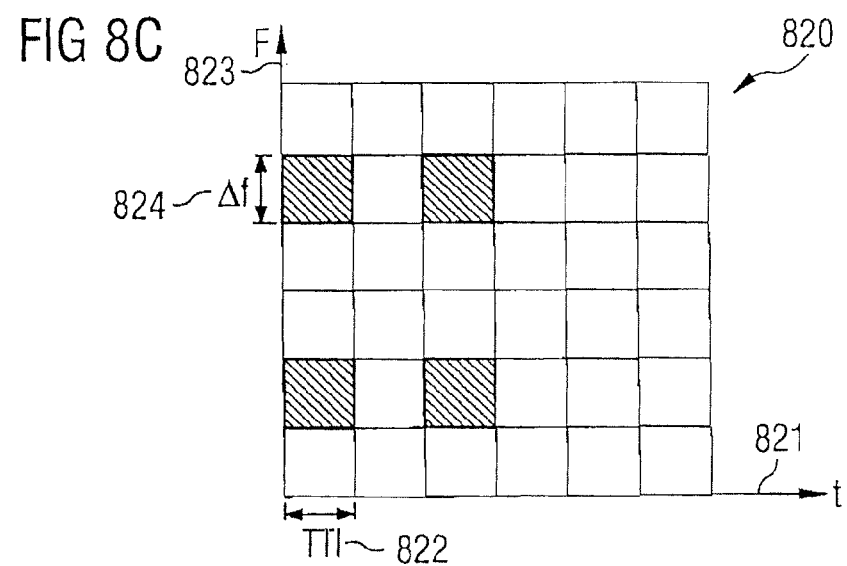

FIG. 8a, FIG. 8b and FIG. 8c illustrate the principle of TDMA (cf. FIG. 8a), OFDMA (cf. FIG. 8b) and OFDMA/TDMA (cf. FIG. 8c).

The respective graphs 800, 810, 820 respectively plot the time, split into transmission time intervals TTI 802, 812, 822 of 10 ms, for example, along a time axis 801, 811, 821. A frequency axis F 803, 813, 823 respectively shows the frequency range, possibly split into frequency subranges Δf 814, 824.

FIG. 8a shows that in the TDMA method the respective full frequency range is available to a subscriber for transmission in each time frame 802 (shaded area in FIG. 8a).

FIG. 8b shows that the full time range is available to a subscriber for transmission for a respective frequency subrange Δf 814 (shown by way of example in FIG. 8b by means of the shaded areas).

In line with the OFDMA/TDMA method, as shown in FIG. 8c, a subscriber is allocated a respective discrete time frame 822, paired with a discrete frequency subrange Δf 824, as symbolized by way of example in FIG. 8c using the shaded areas.

FIG. 9 uses a graph 900 to show the principle of OFDMA in combination with a frequency hopping method. The graph 900 again shows a time axis 901, the time being split into transmission time intervals of equal size, also called time frames TTI 902. A second axis of the graph is the frequency axis F 903, the total frequency being split into frequency subranges Δf 904 which are likewise of equal size, for example. In line with OFDMA in combination with a frequency hopping method, the data are transmitted in the frequency band in interleaved form, i.e. after each time frame 902 the subcarrier is changed on the basis of a defined set of rules in order to reduce frequency-selective disturbances in the mobile radio channel further. A frequency hopping method is therefore a type of CDMA method in principle. FIG. 9 uses numbers in the respective time slots and "frequency slots" to show the allocated time ranges for transmission.

OFDMA or OFDM is already being used today in various application areas, for example, in a WLAN (Wireless Local Area Network) communication system based on IEEE 802.11a and IEEE 802.11g and also in DVB-T (Digital Video Broadcasting-Terrestrial) and DVB-H (Digital Video Broadcasting-Handheld).

According to one embodiment system information in a mobile radio communication network is transmitted more efficiently compared to conventional methods.

According to one embodiment, a method for the computer-aided formation of system information medium access control protocol messages is provided, wherein system information data packets are received from at least one logical channel, with at least some of the system information data packets having associated prioritization information which is used to indicate the priority of the respective system information data packet. The system information medium access control protocol messages are formed using at least some of the system information data packets from the logical channel taking into account the prioritization information.

According to another embodiment, a method for the computer-aided ascertainment of system information from system information medium access control protocol messages is provided, wherein a first system information medium access control protocol message from a transport channel is received, the system information medium access control protocol message containing a statement indicating how a second system information medium access control protocol message is transmitted. The statement is ascertained from the first system information medium access control protocol message and the second system information medium access control protocol message is received taking into account the ascertained statement.

According to a further embodiment, a medium access control unit for forming system information medium access control protocol messages is provided which has a reception unit for receiving system information data packets from at least one logical channel, at least some of the system information data packets having associated prioritization information which is used to indicate the priority of the respective system information data packet. In addition, an encoding unit is provided for forming the system information medium access control protocol message using at least some of the system information data packets from the logical channel taking into account the prioritization information.

Furthermore, according to another embodiment, a mobile radio communication device having a medium access control unit as described above is provided, which can be set up as a mobile radio base station for example.

In addition, according to a further embodiment, a medium access control unit for ascertaining system information from system information medium access control protocol messages is provided, having a reception unit for receiving a first system information medium access control protocol message from a transport channel, which message contains a statement indicating how a second system information medium access control protocol message is transmitted. Furthermore, an ascertainment unit is provided for ascertaining the statement on the first system information medium access control protocol message. The reception unit is set up such that it can change reception characteristics on the basis of the ascertained statement in order to receive the second system information medium access control protocol message. The reception parameters of the reception unit are thus set such that the latter can receive the second system information medium access control protocol message.

In addition, a mobile radio communication device having a medium access control unit as described above is provided according to one embodiment which is set up as a mobile radio communication terminal, for example.

In addition, appropriate computer program elements for implementing the functionalities described above or the methods described above are provided according to embodiment.

In this connection, it should be pointed out that the embodiments can be implemented in software, i.e. using a computer program, in hardware, i.e. using an electronic circuit set up specifically for this purpose, or in hybrid form, i.e. using arbitrary components in hardware and in software.

By prioritizing the system information data packets from the logical channel and appropriately taking into account the prioritization information at the level of the medium access control protocol layer (MAC protocol layer) when mapping these messages onto the transport channel, in other words when forming the MAC protocol messages, it is possible to adjust to possibly changing transmission constraints very quickly. It is also possible to send information with appropriate prioritization of static, only slowly changing system information on a secure mobile radio channel, which can always be received by all subscriber terminals in a mobile radio cell, and to distribute quickly changing information over temporarily changing radio resources, for example, or even temporarily not transmit the information when there is insufficient available bandwidth for appropriate use. The system information data packets from the logical channel are therefore scheduled on the basis of the nature or type of the system information when mapping on to the respective transport channel.

The exemplary embodiments described below relate, as far as appropriate, both to the methods, the medium access control units and the mobile radio communication device and to the computer program elements according to the embodiments.

In line with one refinement, the system information medium access control protocol messages are mapped onto at least one transport channel.

The system information data packets can be received from at least one logical broadcast channel, for example, from the Broadcast Control Channel (BCCH) logical channel in line with UMTS.

In line with another refinement, the system information medium access control protocol message is mapped onto at least one broadcast transport channel, for example, on to the Broadcast Channel (BCCH) transport channel when used within the context of UMTS.

However, the system information medium access control protocol messages can also be mapped onto a plurality of broadcast transport channels.

The received system information data packets can be grouped into at least system information data packets of a first group and system information data packets of a second group in line with the prioritization information. The system information data packets in the first group have at least a first system information medium access control protocol message formed for them, and the system information data packets in the second group have at least a second system information medium access control protocol message formed for them. In this case, the prioritization information corresponds to the statement of the type of the system information which is to be transmitted using the system information data packets from the logical channel.

Examples of the system information which is to be transmitted are as follows:
  information for the UMTS core network and also the configuration of system-related timers and constants;
  parameters for mobile radio cell selection and mobile radio cell change;
  a configuration of the physical joint radio resources for subscriber appliances in idle mode;
  a configuration of the physical joint radio resources for subscriber appliances in connected mode;
  information for performing measurements.

The first system information medium access control protocol message can contain system information which is not updated in the course of a prescribable time interval, in other words only slowly changing system information, also called static system information. The second system information medium access control protocol message can contain system information which is updated, needs to be updated or generally loses its validity before the prescribable time interval has elapsed, i.e. normally system information which is faster-changing system information also called dynamic system information.

This makes it a very simple and type-matched matter to transmit the system information in optimized and efficient fashion.

The first system information medium access control protocol message can contain at least some of the following system information, for example:
  PLMN identity;
  radio cell identity;
  configuration of system-related timers and constants;
  configuration of the physical joint radio resources;
  information for performing measurements.

The second system information medium access control protocol message can contain at least some of the following system information, for example:
  interference situation on the uplink;
  transmission parameters for random access channels in the uplink;
  time validity of the dynamic system information.

The system information medium access control protocol messages can be transmitted using a multiple access method, for example using a frequency-division multiple access method and in this context using a multiple carrier frequency-division multiple access method, for example, the multiple access method being able to be a combined multiple access method, for example, a multiple carrier frequency-division multiple access method combined with a frequency hopping multiple access method or combined with a time-division multiplex multiple access method.

The multiple carrier frequency-division multiple access method used may be the Orthogonal Frequency-division multiple access method (OFDMA method) for example.

In line with another refinement, the first system information medium access control protocol message is formed such that it contains a statement indicating how the second system information medium access control protocol message is transmitted, for example the frequency band in which the second system information medium access control protocol message is transmitted and/or the time slot in which the second system information medium access control protocol message is transmitted.

In this way, it is a very simple matter to include, by way of example, a reference in the first system information medium access control protocol message, for example, in a field provided especially for this purpose, and to use this field to refer to the respective time slot or to the respective frequency band which is used for transmitting the respective second system information medium access control protocol message.

By way of example, the subject matter of the application may be used in a cellular mobile radio communication system, for example in a GSM mobile radio communication system, in addition in a 3GPP mobile radio communication system or in a 3GPP2 mobile radio communication system, for example. In particular, the subject matter of the application may be used in a UMTS mobile radio communication system or in a CDMA2000 mobile radio communication system or in a FOMA (Freedom of Multimedia Access) mobile radio communication system.

Exemplary embodiments are illustrated in the figures and are explained in more detail below.

FIG. 1 shows a UMTS mobile radio communication system 100, for reasons of simpler illustration particularly the components of the UMTS mobile radio access network (UMTS Terrestrial Radio Access Network, UTRAN), which has a plurality of mobile radio network subsystems (RNS) 101, 102, which are respectively connected to the UMTS core network (CN) 105 by means of what is known as an Iu interface 103, 104. A mobile radio network subsystem 101, 102 respectively has a mobile radio network control unit (Radio Network Controller, RNC) 106, 107 and one or more UMTS base stations 108, 109, 110, 111, which are also called NodeB in line with UMTS.

Within the mobile radio access network, the mobile radio network control units 106, 107 of the individual mobile radio network subsystems 101, 102 are connected to one another by means of what is known as an Iur interface 112. Each mobile radio network control unit 106, 107 respectively monitors the allocation of mobile radio resources in all mobile radio cells in a mobile radio network subsystem 101, 102.

A UMTS base station 108, 109, 110, 111 is respectively connected to a mobile radio network control unit 106, 107 associated with the UMTS base station 108, 109, 110, 111 by means of what is known as an Iub interface 113, 114, 115, 116.

Each UMTS base station 108, 109, 110, 111 provides radio coverage for one or more mobile radio cells (CE) within a mobile radio network subsystem 101, 102. Message signals or data signals are transmitted between a respective UMTS base station 108, 109, 110, 111 and a subscriber appliance 118 (User Equipment, UE), subsequently also called a mobile radio terminal, in a mobile radio cell using an air interface, called a Uu air interface 117 in line with UMTS, for example on the basis of a multiple access transmission method.

In line with the UMTS-FDD (Frequency Division Duplex) mode, for example, separate signal transmission in the uplink and downlink (uplink: signal transmission from the mobile terminal 118 to the respective UMTS base station 108, 109, 110, 111; downlink: signal transmission from the respective associated UMTS base station 108, 109, 110, 111 to the mobile radio terminal 118) is achieved through appropriate separate allocation of frequencies or frequency ranges.

A plurality of subscribers, in other words a plurality of activated—or registered in the mobile radio access network—mobile radio terminals 118, in the same mobile radio cell are for example isolated from one another in terms of signaling by means of orthogonal codes, particularly in line with what is known as the CDMA (Code Division Multiple Access) method.

In this connection, it should be noted that FIG. 1 shows just one mobile radio terminal 118 for reasons of simple illustration. In general, however, any number of mobile radio terminals 118 are provided in the mobile radio system 100.

The communication between a mobile radio terminal 118 and another communication appliance can be set up using a complete mobile radio communication link to another mobile radio terminal, alternatively to a landline communication appliance.

As FIG. 2 shows, the UMTS air interface 117 is logically divided into three protocol layers (symbolized in FIG. 2 by a protocol layer arrangement 200). The units (entities) which ensure and implement the functionality of the respective protocol layers described below are implemented both in the mobile radio terminal 118 and in the UMTS base station 108, 109, 110, 111 or in the respective mobile radio network control unit 106, 107.

The bottommost layer shown in FIG. 2 is the physical layer PHY 201, which is protocol layer 1 in line with the OSI (Open System Interconnection) reference model based on ISO (International Standardisation Organisation).

The protocol layer arranged above the physical layer 201 is the data link layer 202, protocol layer 2 in line with the OSI reference model, which for its part has a plurality of protocol sublayers, namely the Medium Access Control protocol layer (MAC protocol layer) 203, the Radio Link Control protocol layer 204 (RLC protocol layer), the Packet Data Convergence Protocol protocol layer 205 (PDCP protocol layer), and the Broadcast/Multicast Control protocol layer 206 (BMC protocol layer).

The topmost layer of the UMTS air interface Uu is the mobile radio network layer (protocol layer 3 in line with the OSI reference model) having a mobile radio resource control unit 207 (Radio Resource Control protocol layer, RRC protocol layer).

Each protocol layer 201, 202, 203, 204, 205, 206, 207 provides the protocol layer situated above it with its services via prescribed, defined service access points.

To provide a better understanding of the protocol layer architecture the service access points are provided with generally customary and unique names, such as logical channels 208 between the MAC protocol layer 203 and the RLC protocol layer 204, transport channels 209 between the physical layer 201 and the MAC protocol layer 203, Radio Bearer (RB) 210 between the RLC protocol layer 204 and the PDCP protocol layer 205 or the BMC protocol layer 206, and Signaling Radio Bearer (SRB) 213 between the RLC protocol layer 204 and the RRC protocol layer 207.

In line with UMTS, the protocol structure 200 shown in FIG. 2 is not just split horizontally into the protocol layers and units of the respective protocol layers which are described above but also vertically into what is known as a control protocol level 211 (Control plane, C plane), which contains parts of the physical layer 201, parts of the MAC protocol layer 203, parts of the RLC protocol layer 204 and the RRC protocol layer 207, and the user protocol level 212 (User plane, U plane), which contains parts of the physical layer 201, parts of the MAC protocol layer 203, parts of the RLC protocol layer 204, the PDCP protocol layer 205 and the BMC protocol layer 206.

The units of the control protocol level 211 are used exclusively to transmit control data, which are required for setting up and clearing down and also maintaining a communication link, whereas the units of the user level 212 are used to transport the actual useful data.

Each protocol layer or each unit (entity) of a respective protocol layer has particular prescribed functions within the context of mobile radio communication.

At the transmitter end, the task of the physical layer 201 or the units of the physical layer 201, is to ensure secure transmission of data coming from the MAC protocol layer 203 via the air interface 117. In this connection, the data are mapped onto physical channels (not shown in FIG. 2). The physical layer 201 provides its services to the MAC protocol layer 203 via transport channels 209, which are used to stipulate how and with what characteristics the data are to be transported via the air interface 117. The fundamental functions which are provided by the units of the physical layer 201 comprise channel encoding, modulation and CDMA code spreading. Accordingly, the physical layer 201 or the entities of the physical layer 201 at the receiver end perform(s) the CDMA code de-spreading, the demodulation and the decoding of the received data and then forward(s) these data to the MAC protocol layer 203 for further processing.

The MAC protocol layer 203 or the units of the MAC protocol layer 203 provide(s) its/their services to the RLC protocol layer 204 using logical channels 208 as service access points, which characterize the file type which the transported data involve. The task of the MAC protocol layer 203 in the transmitter, i.e. for data transmission in the uplink in the mobile radio terminal 118, is particularly mapping the data which are present on a logical channel 208 above the MAC protocol layer 203 onto the transport channels 209 of the physical layer 201. For this the physical layer 201 provides the transport channels 209 with discrete transmission rates. An important function of the MAC protocol layer 203 or of the entities of the MAC protocol layer 203 in the mobile radio terminal 118 in the case of transmission is therefore selection of a suitable transport format TF for each configured transport channel on the basis of the respective current data transmission rate and the respective data priority of the logical channels 208 which are mapped onto the respective transport channel 209, and also the available transmission power of the mobile radio terminal 118 (UE). A transport format stipulates, inter alia how many MAC data packet units, called a transport block, per transmission period TTI (Transmission Time Interval) are sent, in other words transferred, via the transport channel 209 to the physical layer 201. The permissible transport formats and also the permissible combinations of transport formats for the various transport channels 209 are signaled to the mobile radio terminal 118 via the mobile radio network control unit 106, 107 in the form of what is known as the uplink TFCS (Transport Format Combination Set, set of permitted transport format combinations) when a communication link is set up. In the receiver, the units of the MAC protocol layer 203 split the transport blocks received on the transport channels 209 over the logical channels 208 again.

The MAC protocol layer or the units of the MAC protocol layer 203 normally has/have three logical units. What is known as the MAC-d unit (MAC-dedicated unit) handles the useful data and the control data, which are mapped onto the dedicated transport channels DCH (Dedicated Channel) via the appropriate dedicated logical channels DTCH (Dedicated Traffic Channel) and DCCH (Dedicated Control Channel). The MAC-c/sh unit (MAC control/shared unit) handles the useful data and the control data from logical channels 208, which are mapped onto the common transport channels 209, such as the common transport channel RACH (Random Access Channel) in the uplink or the common transport channel FACH (Forward Access Channel) in the downlink. The MAC-b unit (MAC-Broadcast unit) handles only the mobile-radio-cell-related system information, which is mapped onto the transport channel BCH (Broadcast Channel) via the logical channel BCCH (Broadcast Control Channel) and is transmitted by broadcast to all mobile radio terminals 118 in the respective mobile radio cells.

The RLC protocol layer 204 or the units of the RLC protocol layer 204 is/are used to provide its/their services to the RRC protocol layer 207 by means of Signaling Radio Bearer (SRB) 213 as service access points and to the PDCP protocol layer 205 and the BMC protocol layer 206 by means of Radio Bearer (RB) 210 as service access points. The Signaling Radio Bearers and the Radio Bearers characterize the way in which the RLC protocol layer 204 is to deal with the data packets. To this end, by way of example, the RRC protocol layer 207 stipulates the transmission mode for each configured Signaling Radio Bearer or Radio Bearer. In line with UMTS, the following transmission modes are provided:

Transparent Mode (TM),
Unacknowledged Mode (UM), or
Acknowledged Mode (AM).

The RLC protocol layer 204 is modeled such that there is one independent RLC entity per Radio Bearer or Signaling Radio Bearer. In addition, the task of the RLC protocol layer or of its entities 204 in the transmission device is to split or combine the useful data and the signaling data from Radio Bearers or Signaling Radio Bearers into data packets. The RLC protocol layer 204 transfers the data packets produced following the split or combination to the MAC protocol layer 203 for the purpose of further transport or for the purpose of further processing.

The PDCP protocol layer 205 or the units of the PDCP protocol layer 205 is/are set up for the transmission or the reception of data from what is known as the Packet-Switched domain (PS domain). The main function of the PDCP protocol layer 205 is compression and decompression of the IP header information (Internet Protocol header information).

The BMC protocol layer 206 or its entities is/are used to transmit and receive what are known as cell broadcast messages by the air interface.

The RRC protocol layer 207 or the entities of the RRC protocol layer 207 is/are responsible for setting up and clearing down and reconfiguring physical channels, transport channels 209, logical channels 208, Signaling Radio Bearers 213 and Radio Bearers 210 and also for negotiating all the parameters of the protocol layer 1, i.e. the physical layer 201 and the protocol layer 2. To this end, the RRC units, i.e. the units of the RRC protocol layer 207, in the mobile radio network control unit 106, 107 and the respective mobile radio terminal 118 interchange appropriate RRC messages via the Signaling Radio Bearers 213.

In line with the embodiments below, the MAC unit described above and for that reason particularly the MAC-b unit (MAC-Broadcast unit) are set up such that the additional functionalities described below are implemented for transmitting system information to the mobile radio terminals 118, respectively situated in a mobile radio cell. This applies to the respective MAC-b unit both in the mobile radio communication terminal 118 and in the UMTS base station 108, 109, 110, 111.

To provide better clarification of the exemplary embodiments below, a general description of the embodiments is first of all explained.

In general terms, the text below presents a solution for efficiently transmitting system information to a mobile radio cell, using the UMTS base station 108, 109, 110, 111, in respect of an additional UMTS communication system on the basis of an OFDMA/TDMA multiple access method, and it should be pointed out that other multiple access methods and also other transmission methods may be provided within the context of the application instead of the OFDMA/TDMA multiple access method.

By way of example, reference should be made to the following aspects:

The MAC-b unit in the UMTS base station 108, 109, 110, 111 usually performs the scheduling. The scheduling is effected on the basis of the respective type of the information which is to be transmitted:

The static, i.e. slowly variable, system information is sent using predefined subcarriers which are known throughout the system. In this context, one alternative refinement also provides for a combination with a frequency hopping method in order to ensure additional frequency diversity.

Examples of static system information are:
PLMN identity;
Radio cell identity;
Configuration of system-related timers and constants;
Configuration of the physical joint radio resources;
information for performing measurements.

The dynamic, i.e. more rapidly variable system information is sent flexibly using available subcarriers and transmission time intervals.

Examples of dynamic system information are:
interference situation on the uplink;
transmission parameters for random access channels in the uplink;
time validity of the dynamic system information.

In addition, the scheduling is effected on the basis of the channel properties and the traffic load in the mobile radio cell, i.e., by way of example when transmission conditions in the mobile radio cell are poor, the transmission of the static system information using the predefined subcarriers (individual subcarriers or else all subcarriers) is temporarily stopped;

when the traffic load is low, the transmission capacity for dynamic system information which is to be transmitted is temporarily increased.

In line with the embodiments which follow, it is assumed that a base station 108, 109, 110, 111 in cellular mobile radio communication networks based on GSM or UMTS uses broadcasts to transmit mobile radio cell information which is relevant to the system and to mobile radio cells to all subscriber appliances situated in the mobile radio cell, i.e. the mobile radio terminal 118, for example.

In the case of UMTS, this is done using the Broadcast Control Channel (BCCH) logical channel 301 (cf. block diagram 300 in FIG. 3), which is mapped on to the Broadcast Channel (BCH) transport channel 302 and is physically sent on the Primary Common Control Physical Channel (P-CCPCH) physical channel 303 via the air interface 117 (see FIG. 1). The BCCH 301 and the BCH 302 are respectively used to send 246 information bits to the physical layer 303, where they are then channel-encoded, modulated and spread using a spreading code, known throughout the system, with the spreading factor SF=256. Since a fixed transmission period of TTI=20 ms is defined for the BCH, the channel-encoded data are transmitted via the air interface 117 in the mobile radio cell with a distribution over two P-CCPCH frames of length 10 ms.

FIG. 3 shows a BCCH frame 304 having 246 bits, which is mapped on to a BCH frame 305, likewise having 246 bits, with a transmission period TTI=20 ms, which BCH frame 305 for its part is mapped onto the physical channel, in line with FIG. 3 onto two P-CCPCH frames, namely a first P-CCPCH frame 306 and a second P-CCPCH frame 307.

A block diagram 400 in FIG. 4 shows a MAC-b unit 401 based on an exemplary embodiment. In line with these embodiments, at least two logical channels, i.e. a first logical channel BCCH1 402 and a second logical channel BCCH2 403, are provided and also at least two transport channels, namely a first transport channel BCH1 404 and a second transport channel BCH2 405.

The first logical channel BCCH1 402 is used to send the static system information, i.e. the system information which is grouped as static system information, and the second logical channel BCCH2 403 is used to send the dynamic system information to the MAC-b unit 401, in other words the system information which is grouped as more rapidly changing system information.

Each transport channel BCH1 404 and BCH2 405 has a respective set of transport formats defined for it which indicate the permissible discrete transmission rates of the transport channel.

The data on the first transport channel BCH1 404 are physically sent using predefined subcarriers which are known throughout the system, possibly in combination with a frequency hopping method.

The data to be transmitted on the second transport channel BCH2 405, on the other hand, are sent flexibly using available subcarriers and transmission time intervals.

The transmission capacity configured by the mobile radio communication network for the first transport channel BCH1 404 is the "guaranteed" transmission capacity, whereas the transmission capacity configured for the second transport channel BCH2 405 is, together with the first transport channel BCH1 404, the maximum permitted total capacity.

The MAC-b unit 401 based on these embodiments has a function and hence a corresponding unit implementing this function, for example, using a microprocessor, for scheduling or for priority handling.

In this context, the following principles are applied:

The logical channels BCCH1 402 and BCCH2 403 can respectively be multiplexed onto any of the two transport channels BCH1 404 and BCH2 405.

When data are multiplexed onto the first transport channel BCH1 404, the data from the first logical channel BCCH1 402 have higher priority that the data from the second logical channel BCCH2 403.

If permitted by the transmission capacity of the first transport channel BCH1 404, both data from the first logical channel BCCH1 402 and data from the second logical channel BCCH2 403 can be multiplexed onto the first transport channel BCH1 404.

If the transmission capacity of the first transport channel BCH1 404 is not sufficient, only data from the first logical channel BCCH1 402 are multiplexed onto the first transport channel BCH1 404.

As an alternative to the solution described above with (at least) two logical broadcast channels 402, 403, a solution with just one logical broadcast channel is alternatively possible, i.e. in this case static system information and dynamic system information is sent to the MAC-b unit 401, i.e. is supplied to it, using the same logical channel.

In this case, provision is made for the logical channel BCCH to be used to send or supply priority information to the MAC-b unit 401 besides the data which are to be transmitted, i.e. in addition to the data which are to be transmitted, so that the MAC-b unit 401 can perform the scheduling and priority handling correctly on the basis of the type of system information which is to be transmitted, taking into account the priority information obtained which is associated with the data supplied to the MAC-b unit 401 via the logical channel BCCH.

In addition, FIG. 4 also shows a MAC control unit 406 for controlling the MAC-b unit 401.

Figure 5B:
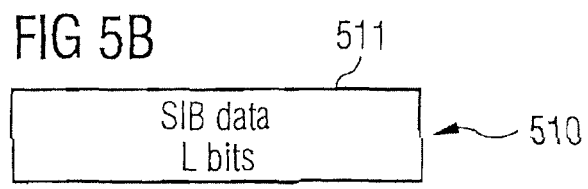

To transmit system information on the first transport channel BCH1 404 and on the second transport channel BCH2 405, these exemplary embodiments define new data formats, as shown by way of example in FIG. 5*a* and FIG. 5*b*.

To improve clarification, the top of FIG. 5*a* shows the data format of the BCH message 700, to date, as has been explained above in connection with FIG. 7.

The data format for a first system information message 500 has three message fields, namely a first system information indicator field 501 of length M bits (M is a fundamentally arbitrary natural number), a system frame number field 502 of length 12 bits, and a useful data field 503 of length N bits (also called SIB data).

The system information indicator (Sys-IND) field 501 is used to signal to the subscribers where (for example, the subcarrier used and the transmission time interval (TTI) are indicated) the system information are sent using the second transport channel BCH2 405. The system information indicator field 501 is added in the physical protocol layer. The first system information message 500 is transmitted using the first transport channel BCH1 404.

The data format of a second system information message 510 which is to be transmitted using the second transport channel BCH2 405 is shown in FIG. 5*b*.

The second system information message 510 has just one useful data field, in other words a system information data field 511 of length L bits (L is a fundamentally arbitrary natural number). This field contains exclusively system information ("SIB data").

On the basis of these embodiments, the following applies for signaling the position of the system information:

The position of the static system information on the first transport channel BCH1 404 is stipulated by the mobile radio communication network, i.e. it is assumed to be known throughout the system for rapid finding.

The dynamic system information's position, which is transmitted on the second transport channel BCH2 405, is signaled to the subscribers, i.e. to the mobile radio terminals 118, in the mobile radio cell by means of the system information indicator field 501, which is transmitted using the first transport channel BCH 404.

The advantages of the signaling described above, in particular, are as follows:

The transmission of system information is adapted for an OFDMA/TDMA multiple access method.

The transmission capacity for system information can be adapted dynamically on the basis of the channel properties and the traffic load in the mobile radio cell.

The reading time for the system information for the subscribers in a mobile radio cell is reduced.

Without restricting general validity, the following configuration is also considered by way of example:
an OFDMA/TDMA multiple access method is used;
the FDD radio transmission technology is used;
a MAC-b unit 401 as shown in FIG. 4 is used at MAC-b protocol layer level;
the data formats of the system information messages 500, 510 as shown in FIGS. 5a and 5b, are used for the messages which are transmitted on the first transport channel BCH1 404 and on the second transport channel BCH2 405;
the following transport formats are provided for the first transport channel BCH1 404: (1x246, 2x246) in bits;
the following transport formats are provided for the second transport channel BCH2 405: (0x336, 1x336, 2x336) in bits.

Figure 6:
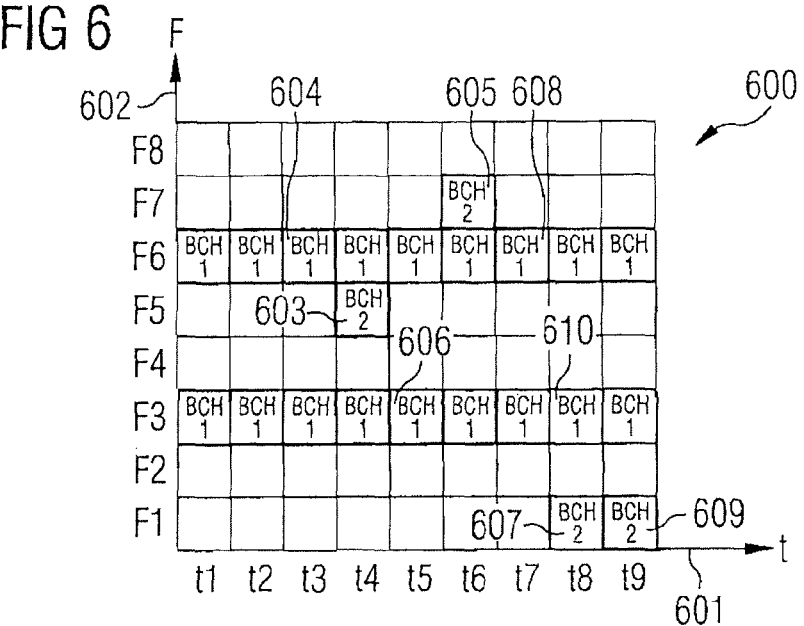
FIG. 6 shows a graph showing an OFDMA/TDMA transmission method based on an exemplary embodiment.

FIG. 6 uses a graph 600 to show a structure for transmitting the system information, in other words the system information messages 500, 510. Along a time axis 601, the graph 600 shows nine time frames t1, t2, . . . , t9. Along a frequency axis 602 it shows that the frequency space under consideration is split into eight frequency ranges F1, F2, . . . , F8, i.e. eight subcarriers are used for transmitting system information via the transport channels 404, 405.

The system information on the first transport channel BCH1, in other words, the first system information messages 501, are sent permanently on two subcarriers (F3, F6), whereas the system information on the second transport channel BCH2 405, in other words the second system information messages 510, are sent as required flexibly using available subcarriers and transmission time intervals.

The position of the dynamic system information on the second transport channel BCH2 405 is signaled to the subscribers in the mobile radio cell using the system information indicator field 501 on the first transport channel BCH1, i.e. in a first system information message 500. In this context, it is assumed that the signaling takes place one time transmission interval (TTI) (or several time transmission intervals) previously in time. The signaling is effected in the form of a tuple (subcarrier, TTI), i.e. the positions of a first second system information message 603 (F5, t4) for the second transport channel BCH2 405 are signaled in a first system information message 604, which is transmitted in a time slot preceding this in time, for example in the third time slot t3. The position of a second system information message 605 (F7, t6) is signaled in a second first system information message 606 in a time transmission interval t5 which precedes in time, in this case using the third subcarrier F3.

It is also assumed that the signaling for a third second system information message 607 (F1, t8) is effected in a third first system information message 608, which likewise precedes this in time and which is transmitted via the sixth subcarrier F6. The position of a fourth second system information message 609 (F1, t9) is signaled using a fourth first system information message 610, which is likewise transmitted at a time preceding this and which is transmitted using the third subcarrier F3 in the eighth time slot t8.

In summary, aspects of the application can be seen in that the system information is scheduled in the MAC-b unit in the UMTS base station. The scheduling is performed on the basis of the respective type of the information which is to be transmitted (static/dynamic) and on the basis of the channel properties and the traffic load in the mobile radio cell.

The new MAC-b architecture comprises a function for scheduling or priority handling, for example, at least two logical channels and two transport channels.

New data formats are defined for transmitting system information on (at least) two transport channels. The data format for transmitting the static system information also comprises a field for signaling for the purpose of transmitting the dynamic system information, in line with these embodiments, the system information indicator field.

What is claimed is:

1. A method to transmit system information from a base station in a radio access network, comprising:
receiving data packets over a broadcast control channel (BCCH);
generating first system information blocks from the data packets, the first system information blocks comprising a system frame number, a public land mobile network identity, and a cell identity, wherein one or more of the first system information blocks indicate how a system information message is to be transmitted;
scheduling the first system information blocks for transmission using a fixed schedule;
generating second system information blocks from the data packets;
scheduling the second system information blocks, using dynamic scheduling, for transmission in the system information message;
mapping a first system information block in the first system information blocks to a broadcast channel;
mapping the system information message to another channel; and
transmitting, by the base station, the first system information block and the system information message.

2. The method of claim 1, further comprising using Orthogonal Frequency Division Multiple Access to transmit the first system information blocks and the system information message.

3. The method of claim 1, wherein the second information blocks comprise cell re-selection information.

4. The method of claim 1, wherein the first system information blocks and the second system information blocks are received from the BCCH by a medium access control (MAC) layer.

5. The method of claim 1, further comprising scheduling each system information block based on a corresponding type of data packet received over the BCCH.

6. The method of claim 1, wherein data packets for the second system information blocks are received more often than data packets for the first system information blocks.

7. The method of claim 1, further comprising indicating a frequency band, in the first system information blocks, used to transmit the system information message.

8. A base station, comprising:
a medium access control unit to receive data packets from a radio link control (RLC) protocol layer and to generate system information blocks and a system information message from the data packets, wherein at least one of the system information blocks comprises a statement to indicate how the system information message is to be transmitted, and wherein the system information blocks are to be scheduled for transmission using a fixed schedule, and the system information message is to be scheduled dynamically using available subcarriers and one or more transmission time intervals for an Orthogonal Frequency Division Multiple Access (OFDMA) transmission; and
a transmitter to transmit the one or more system information blocks and the system information message.

9. The base station of claim 8, further comprising receiving the data packets over a broadcast control channel (BCCH).

10. The base station of claim 8, wherein the system information blocks comprise a master information block (MIB) and a system information block type 1 (SIB 1).

11. The base station of claim 10, wherein the MIB is mapped to a broadcast channel (BCH).

12. The base station of claim 8, wherein the medium access control unit comprises a processor.

13. The base station of claim 8, wherein the system information blocks comprise a system frame number, a public land mobile network identity, and a cell identity.

14. The base station of claim 10, wherein the statement is contained in the SIB 1.

15. One or more non-transitory computer-readable media comprising instructions to form one or more medium access control protocol messages, the instructions to cause a computing device, upon execution of the instructions by one or more processors of the computing device, to:
generate system information blocks including a master information block (MIB), from data packets received over a logical channel, wherein a first system information block indicates how a system information message is to be transmitted;
schedule the MIB and the first system information block for transmission using a fixed schedule;
generate second system information blocks from the data packets;
schedule the second system information blocks, using dynamic scheduling, for transmission in the system information message;
map the MIB to a broadcast channel; and
map the first system information block and the system information message to another channel for transmission.

16. The one or more non-transitory computer-readable media of claim 15, wherein the data packets are received over the logical channel from a radio link control layer.

17. The one or more non-transitory computer-readable media of claim 15, wherein the first system information block is a system information block type 1 (SIB 1).

18. The one or more non-transitory computer-readable media of claim 15, wherein the second system information blocks comprise a system information block type 3 (SIB 3) that includes cell reselection information.

19. The one or more non-transitory computer-readable media of claim 15, wherein the instructions are further to the system information blocks onto a plurality of transport channels.

20. The one or more non-transitory computer-readable media of claim 15, wherein data packets for the second system information blocks are received more often than data packets for the first system information block.

* * * * *